(12) United States Patent
Rho

(10) Patent No.: US 6,466,288 B1
(45) Date of Patent: Oct. 15, 2002

(54) MULTI-DOMAIN LIQUID CRYSTAL DISPLAY DEVICE

(75) Inventor: Bong Kyu Rho, Kyungki-do (KR)

(73) Assignee: LG LCD, Inc., Seoul (KR)

( * ) Notice: Subject to any disclaimer, the term of this patent is extended or adjusted under 35 U.S.C. 154(b) by 0 days.

(21) Appl. No.: 09/360,253

(22) Filed: Jul. 23, 1999

(30) Foreign Application Priority Data

Jul. 25, 1998 (KR) ............................................. 98-29992

(51) Int. Cl.[7] ..................... G02F 1/1343; G02F 1/1337; G02F 1/1333; G09K 19/60

(52) U.S. Cl. ...................... 349/141; 349/143; 349/123; 349/138; 349/165

(58) Field of Search ................................. 349/141, 143, 349/123, 165, 138

(56) References Cited

U.S. PATENT DOCUMENTS

| | | | |
|---|---|---|---|
| 3,914,022 A | 10/1975 | Kashnow | |
| 4,701,028 A | 10/1987 | Clere et al. | |
| 4,786,147 A | 11/1988 | Clere et al. | |
| 4,889,412 A | 12/1989 | Clere et al. | |
| 5,039,185 A | 8/1991 | Uthida et al. | |
| 5,093,741 A | 3/1992 | Shohara et al. | |
| 5,182,664 A | 1/1993 | Clere | |
| 5,229,873 A | 7/1993 | Hirose et al. | |
| 5,309,264 A | 5/1994 | Lien et al. | |
| 5,339,181 A | 8/1994 | Kim et al. | |
| 5,477,358 A | 12/1995 | Rosenblatt | |
| 5,517,341 A | 5/1996 | Kim et al. | |
| 5,517,342 A | 5/1996 | Kim et al. | |
| 5,602,662 A | 2/1997 | Rosenblatt et al. | |
| 5,608,556 A | 3/1997 | Koma | |
| 5,621,558 A | 4/1997 | Shimada et al. | |
| 5,666,179 A | * 9/1997 | Koma | 349/143 |
| 5,673,092 A | 9/1997 | Horie et al. | |
| 5,686,977 A | 11/1997 | Kim et al. | |
| 5,767,926 A | 6/1998 | Kim et al. | |
| 5,777,711 A | 7/1998 | Sugiyama | |
| 5,831,707 A | * 11/1998 | Ota et al. | 349/141 |
| 5,949,509 A | * 9/1999 | Ohe et al. | 349/123 |
| 5,953,092 A | * 9/1999 | Yoshida et al. | 349/165 |
| 6,128,061 A | * 10/2000 | Lee et al. | 349/141 |
| 6,157,428 A | * 12/2000 | Koma | 349/138 |
| 6,289,503 B1 | * 7/2001 | Watanabe et al. | 349/141 |

FOREIGN PATENT DOCUMENTS

| | | |
|---|---|---|
| JP | 2-294622 | 12/1990 |
| JP | 3-261914 | 11/1991 |
| JP | 4-067127 | 3/1992 |
| JP | 4-261522 | 9/1992 |
| JP | 5-002161 | 1/1993 |
| JP | 6-19657 | 7/1994 |
| JP | 6-194656 | 7/1994 |
| JP | 6-258649 | 9/1994 |
| JP | 6-273798 | 9/1994 |
| JP | 6-281959 | 10/1994 |
| JP | 6-347824 | 12/1994 |
| JP | 7-013164 | 1/1995 |
| JP | 7-013166 | 1/1995 |
| JP | 7-028063 | 1/1995 |
| JP | 07028063 A | * 1/1995 |

(List continued on next page.)

Primary Examiner—William L. Sikes
Assistant Examiner—Julie Ngo
(74) Attorney, Agent, or Firm—Birch, Stewart, Kolasch & Birch, LLP

(57) ABSTRACT

A multi-domain vertical alignment liquid crystal display device includes upper and lower substrates having upper and lower alignment layers, a pixel electrode on the lower substrate, and a liquid crystal layer between the upper and lower alignment layers. The upper alignment layer is alignment-treated to define a specified alignment direction. The pixel electrode is arranged to define a desired pattern of slits or floating electrodes. The liquid crystal layer includes liquid crystal molecules having negative dielectric anisotropy ($\Delta\epsilon$).

31 Claims, 10 Drawing Sheets

FOREIGN PATENT DOCUMENTS

| | | |
|---|---|---|
| JP | 7-036044 | 2/1995 |
| JP | 7-043698 | 2/1995 |
| JP | 7-043719 | 2/1995 |
| JP | 7-064089 | 3/1995 |
| JP | 7-181493 | 7/1995 |
| JP | 7-199190 | 8/1995 |
| JP | 7-311383 | 11/1995 |
| JP | 8-022023 | 1/1996 |
| JP | 8-076125 | 3/1996 |
| JP | 8-101399 | 4/1996 |
| JP | 8-146468 | 6/1996 |
| JP | 8-220511 | 8/1996 |
| JP | 8-220524 | 8/1996 |
| JP | 8-313915 | 11/1996 |
| JP | 9-022025 | 1/1997 |
| JP | 9-152583 | 6/1997 |
| JP | 9-230360 | 9/1997 |
| JP | 9-325373 | 12/1997 |

\* cited by examiner

B : Left-Handed Twist Alignment
A
C : Parallel
E  Alignment
D : Right-Handed Twist Alignment

MULTI-DOMAIN LIQUID CRYSTAL DISPLAY DEVICE

BACKGROUND OF THE INVENTION

1. Field of the Invention

The present invention relates to a liquid crystal display device, and more particularly, to a multi-domain vertical alignment liquid crystal display device having a very wide viewing angle and increased transmittance while having a structure which allows the multi-domain vertical alignment liquid crystal display device to be manufactured easily and inexpensively.

2. Description of the Related Art

Generally, a vertical alignment liquid crystal display device (LCD) uses liquid crystals having negative dielectric anisotropy. When a voltage is not applied to the liquid crystal molecules, the longitudinal axis of the liquid crystal molecules are perpendicular to a surface of an alignment layer. When a voltage is applied to the liquid crystal molecules, the longitudinal axis of the liquid crystal molecules is parallel to the surface of the alignment layer.

In a mono-domain vertical alignment LCD, a gray inversion is very high at an angle of 45 degrees between a transmittance axis of a polarizer and an azimuth angle of the LCD. The high gray inversion of the mono-domain vertical alignment LCD causes the LCD to have a very small viewing angle.

To solve this problem, a multi-domain LCD was made in order to realize a wide viewing angle. Such multi-domain LCDs are described in, for example, U.S. Pat. Nos. 5,608,556 and 5,309,264.

In the conventional multi-domain LCD shown in FIG. 1, a surrounding electrode or side electrode is provided to achieve alignment of the liquid crystal molecules. FIG. 1 is a sectional view of a TFT LCD (Thin Film Transistor Liquid Crystal Display Device) having the surrounding electrode and which is manufactured by Sanyo Electric Co., Ltd., Japan.

As shown in FIG. 1, the TFT LCD includes an upper substrate 2 having an upper vertical alignment layer 3, a lower substrate 1 having a lower vertical alignment layer 3', a pixel electrode 5 on the lower substrate 1, a common electrode 6 on the upper substrate 2, and liquid crystal material having negative dielectric anisotropy disposed between the upper and lower substrates 2, 1. It should be noted that the upper and lower vertical alignment layers in the structure of FIG. 1 are not alignment treated.

As seen in FIG. 1, there are slits 7 formed in the common electrode 6 on the upper substrate 2 to align the liquid crystal molecules 4 as described below.

When a voltage is not applied to the LCD in FIG. 1, the liquid crystal molecules are aligned vertically, but when a voltage having a value over a threshold voltage ($V_{th}$) is applied to the LCD, a lateral electric field (shown by curved dotted lines in FIG. 1) is generated between slit patterns 7 formed in the common electrode 6, and the longitudinal axes of the liquid crystal molecules are aligned perpendicularly relative to the lateral electric field.

In the FIG. 1, the dotted curved lines shown in the liquid crystal layer represents the lateral electric field. The slit patterns 7 formed in the common electrode 6 on the upper substrate 2 creates a boundary which is a region where the alignment directions of the liquid crystal molecules are changed from one direction to a different direction. As a result, a disclination line is formed at regions located at the slit patterns. The lateral electric field between the surrounding or side electrodes 12, 12' and the pixel electrode 5 is parallel relative to the electric field between the pixel electrode 5 and slit patterns 7, and then the alignment directions of the liquid crystal molecules are determined at the corners of the pixel electrode 5.

The TFT of the conventional LCD is a top gate type, and includes a light shielding layer 13 which is arranged to prevent light from entering into an amorphous silicon (a-Si) layer 10, a source electrode 8, a drain electrode 9, and a gate electrode 11.

In this vertical alignment LCD, since a transmittance axis of a polarizer and a transmittance axis of an analyzer are crossed and perpendicular to each other, the LCD shows a black state when no voltage is applied to the LCD (Normally Black Mode). Further, each pixel is divided into four domains and the liquid crystal molecules are parallel aligned within each domain.

There are several drawbacks and disadvantages with the prior art multi-domain LCDs. Because there are disclination lines at the middle of the slit patterns or between the four domains of each pixel, the transmittance of the LCD is greatly reduced. The disclination lines of the prior art multi-domain LCDs are visible which causes the reduction in transmittance. In addition, the amount of the fringe field effect achieved is limited in conventional multi-domain LCDs so that the view angle, although wider than other mono-domain LCDs, is not sufficiently large. Further, the structure of FIG. 1 makes the multi-domain LCD very difficult to manufacture since the formation of the slit patterns 7 in the common electrode 6 is very time consuming, expensive and difficult, and requires the use of an extra mask step.

SUMMARY OF THE INVENTION

To overcome the many problems of the conventional LCD devices described above, preferred embodiments of the present invention provide an LCD which has a greatly increased view angle, much higher transmittance, and much more rapid response time than the conventional LCD devices.

More specifically, preferred embodiments of the present invention provide a multi-domain LCD having a wide-viewing angle, high brightness/transmittance and rapid response time achieved by a novel and reliable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device includes an upper substrate including an upper alignment layer, a lower substrate including a lower alignment layer, a pixel electrode on the lower substrate, the pixel electrode being patterned to define at least one floating electrode, and a liquid crystal layer between the upper and lower alignment layers, the liquid crystal layer including liquid crystal molecules having negative dielectric anisotropy.

In another preferred embodiment of the present invention, a liquid crystal display device, includes an upper substrate including an upper alignment layer; a lower substrate including a lower alignment layer; a pixel electrode on the lower substrate, the pixel electrode being patterned to define at least one slit; and a liquid crystal layer between the upper and lower alignment layers, the liquid crystal layer including liquid crystal molecules having negative dielectric anisotropy, wherein at least one of the upper alignment layer and the lower alignment layer is alignment-treated in an alignment-treatment direction.

A further preferred embodiment of the present invention provides a liquid crystal display device including an upper substrate including an upper alignment layer, a lower substrate including a lower alignment layer, one of the upper alignment layer and the lower alignment layer being alignment-treated in an alignment-treatment direction, an analyzer, and a polarizer (provided on the upper substrate), a pixel electrode on said lower substrate, said pixel electrode being patterned to define a plurality of slits, said liquid crystal layer including liquid crystal molecules having negative dielectric anisotropy.

Another preferred embodiment of the present invention provides a liquid crystal display device including an upper substrate including an upper alignment layer, a lower substrate including a lower alignment layer, a pixel electrode on said lower substrate, said pixel electrode being patterned to define a plurality of floating electrodes and a liquid crystal layer between said upper and lower alignment layers, said liquid crystal layer including liquid crystal molecules having negative dielectric anisotropy, wherein at least a portion of the liquid crystal molecules are arranged to be twisted in at least one spiral twist pattern extending between the lower substrate and the upper substrate.

Another preferred embodiment of the present invention provides a liquid crystal display device including an upper substrate including an upper alignment layer, a lower substrate including a lower alignment layer, a pixel electrode on said lower substrate, said pixel electrode being patterned to define a plurality of slits, and a liquid crystal layer between said upper and lower alignment layers, said liquid crystal layer including liquid crystal molecules having negative dielectric anisotropy, wherein at least a portion of the liquid crystal molecules are arranged to be twisted in at least one spiral twist pattern extending between the lower substrate and the upper substrate.

In one preferred embodiment of the present invention, an angle between a longitudinal axis of the slits or floating electrodes and the alignment direction is preferably equal to or less than about 50 degrees.

A value of $\Delta n$ (Optical anisotropy of the liquid crystal molecule in light wavelength of 550 nm)$\times d_{LC}$ (Thickness of the liquid crystal layer) is preferably about 0.25 µm to about 0.45 µm.

A preferred embodiment of the liquid crystal display device preferably includes a compensation film, wherein $(((\eta_x+\eta_y)/2)-\eta_z)\times d_c$ is preferably about 0.8 to about 1.2 times $\Delta n d_{LC}$.

$(((\eta_x+\eta_y)/2)-\eta_z)$ is the difference between the average refractive indexes of lights vibrating in a horizontal direction and a vertical direction of the compensation film.

$d_c$: Thickness of the compensation film $\Delta n$: Optical anisotropy of the liquid crystal molecule $d_{LC}$: Thickness of the liquid crystal layer.

A pretilt angle of the upper alignment layer is preferably about 84 to about 89 degrees.

A width of a short axis of the slit or floating electrode is preferably about 5 µm to about 15 µm.

A preferred embodiment of the liquid crystal display device further includes a polarizer, wherein an angle between a longitudinal axis of the at least one slit or floating electrode and a transmittance axis of the polarizer is about 0 degree to about 50 degrees.

The liquid crystal molecules between the adjacent slits or floating electrodes have a left-handed twist arrangement or a right-handed twist arrangement.

The upper alignment layer is preferably rubbing-alignment-treated or photo-alignment-treated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate preferred embodiments of the invention and together with the description serve to explain the principles of the invention. In the drawings, like reference numerals indicate like elements to avoid repetitive description.

DETAILED DESCRIPTION OF PREFERRED EMBODIMENTS

Figure 1:
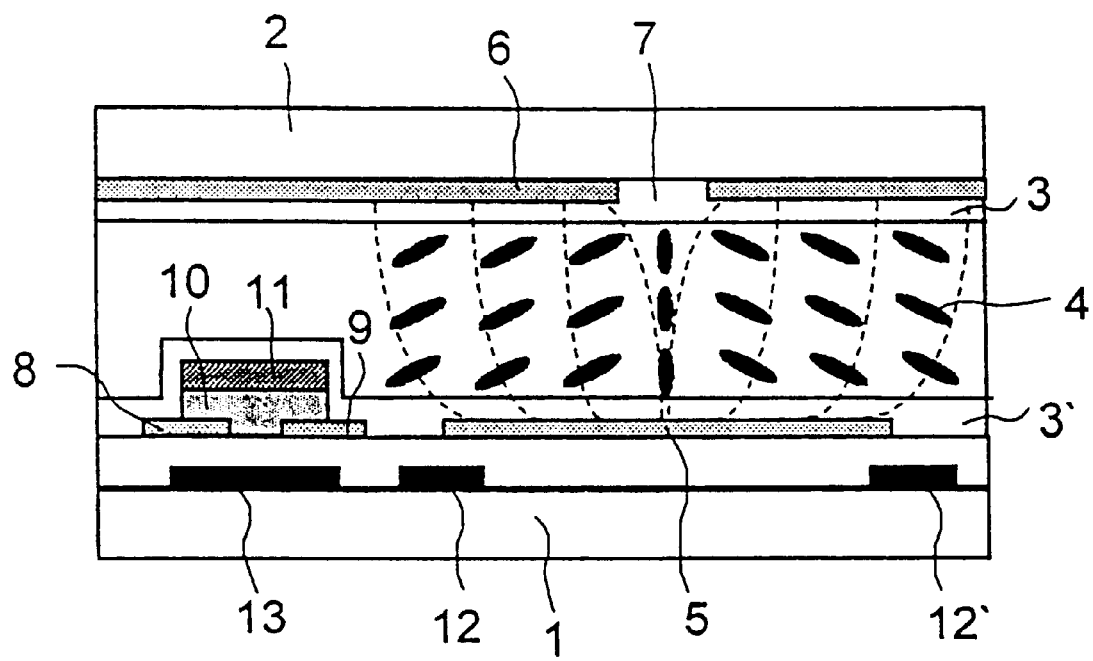
FIG. 1 is a sectional view of the conventional vertical alignment LCD having a surrounding electrode or side electrode.

Hereinafter, preferred embodiments of a multi-domain liquid crystal display device of the present invention are explained in detail with reference to the accompanying drawings.

In preferred embodiments of the present invention, the multi-domain LCD has a structure which is somewhat similar to that of conventional multi-domain LCD devices which effectively use the fringe-field effect, however, there are many differences in structure and function of preferred embodiments of the present invention compared to the conventional multi-domain LCD devices, as will be described below.

A multi-domain LCD according to preferred embodiments of the present invention includes an upper substrate 2, a lower substrate 1, a common electrode 6 on the upper substrate, a pixel electrode 5 on the lower substrate and liquid crystal material disposed between the upper and lower substrates. The upper substrate 2 has an upper vertical alignment layer 3 and the lower substrate has a lower vertical alignment layer 3'.

Figure 2A:
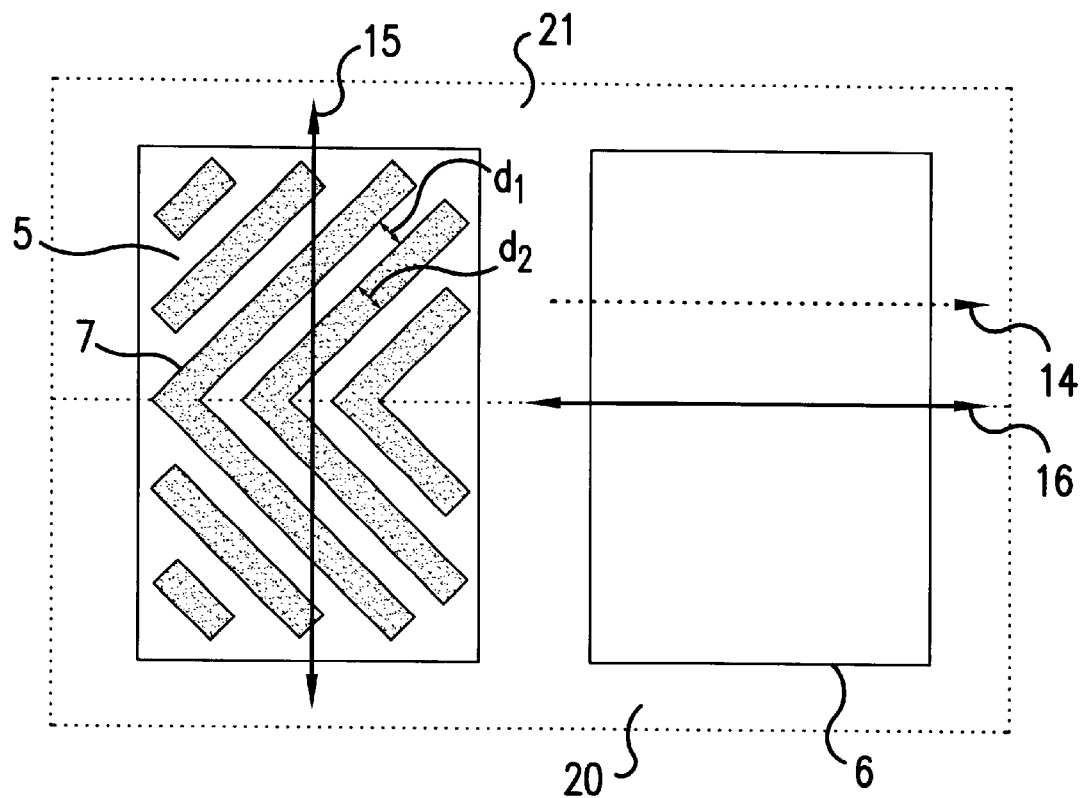
FIG. 2A is a view showing an alignment direction and the pixel electrode according to a preferred embodiment of the present Lateral Field Induced Multi-Domain ("LFIMD") vertical alignment LCD.
Figure 3A:
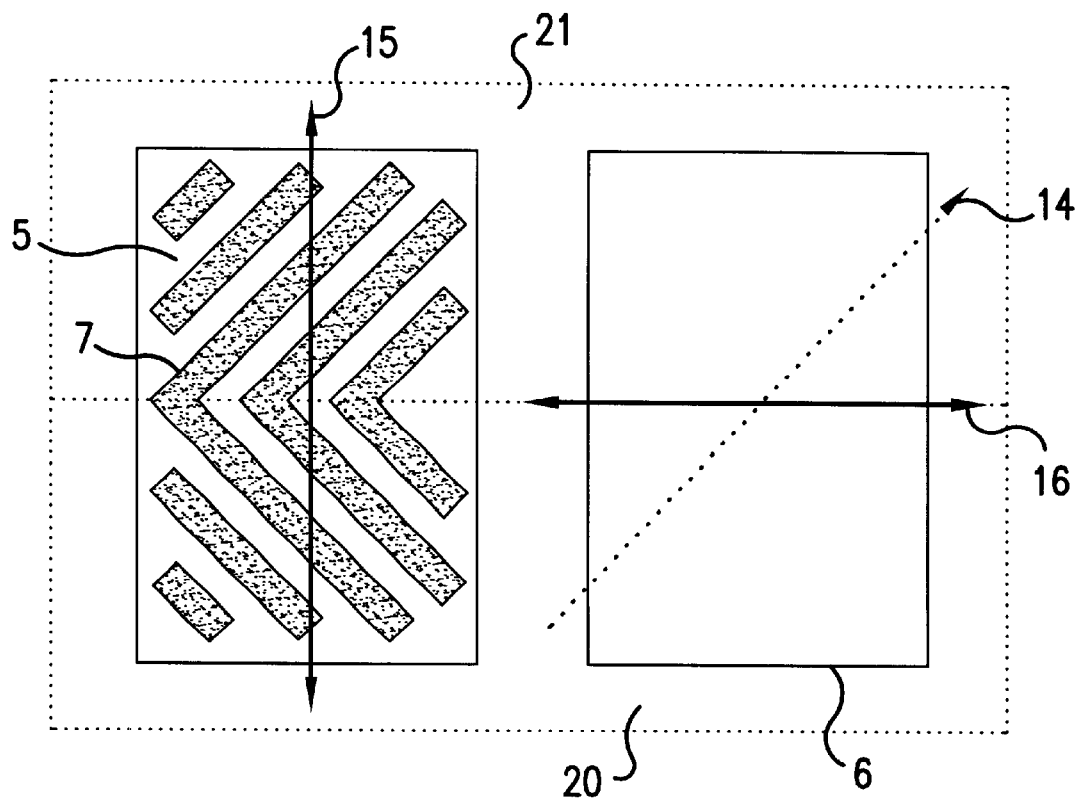
FIG. 3A is a view showing the alignment direction and the pixel electrode according to another preferred embodiment of the present LFIMD vertical alignment LCD.
Figure 4:
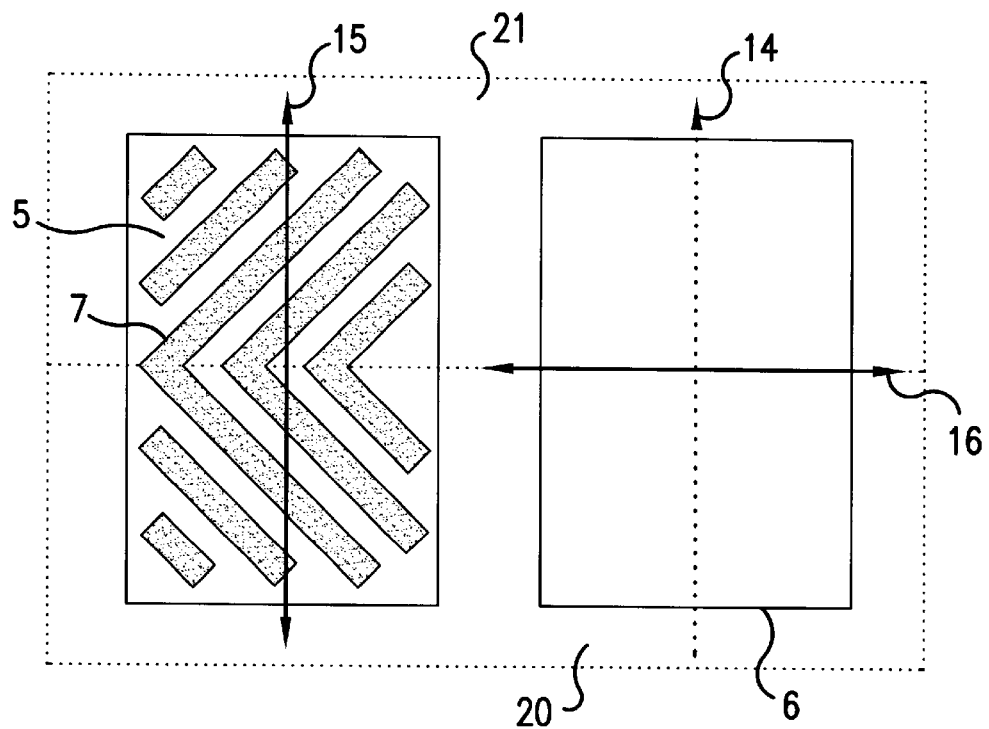
FIG. 4 is a view showing the alignment direction and the pixel electrode according to another preferred embodiment of the present LFIMD vertical alignment LCD.
Figure 5:
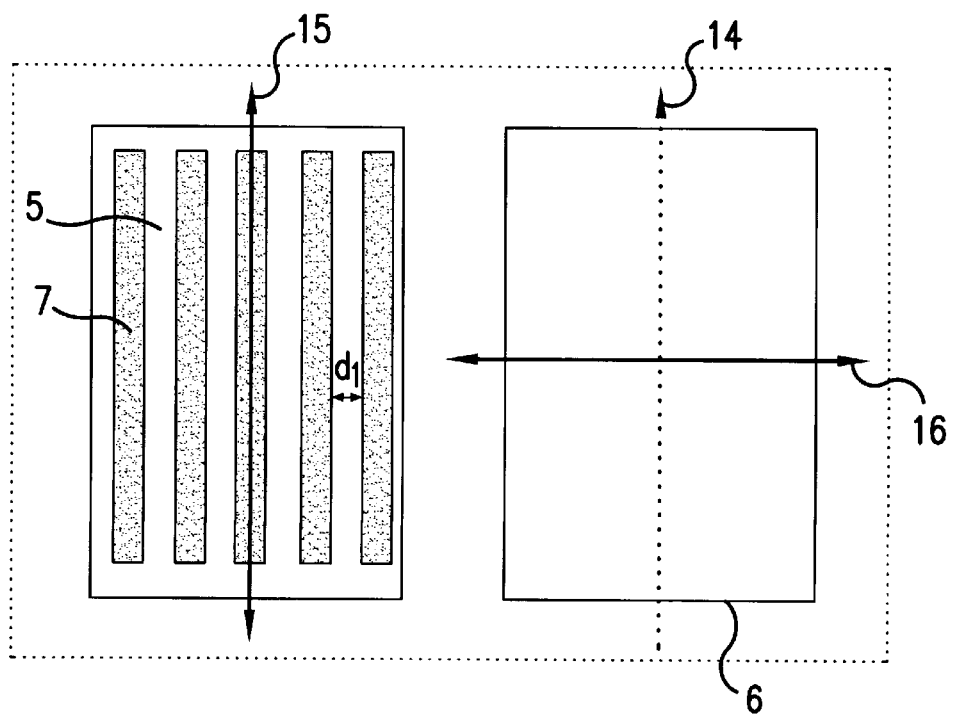
FIG. 5 is a view showing the alignment direction and the pixel electrode according to another preferred embodiment of the present LFIMD vertical alignment LCD.

In contrast to the structure of the conventional device shown in FIG. 1, the pixel electrode 5 of the preferred embodiments of the present invention is preferably patterned to form slits or floating electrodes. The slits or pattern electrodes may be arranged to define a certain pattern along the pixel electrode. For example, the slits or pattern electrodes may be arranged to define a chevron pattern as seen in FIGS. 2A, 3A and 4. Also, the slits or pattern electrodes may be arranged to define a completely straight line pattern as seen in FIG. 5, in which all portions of each of the slits or patterns extend along one substantially straight line. In addition, the slits or pattern electrodes may be arranged to define a combined pattern including a chevron pattern portion as shown in FIGS. 2A, 3A and 4 and a completely straight line portion as shown in FIG. 5. The width of the slits or the distance between floating electrodes is preferably about 2 µm to about 10 µm. Also, the slits or floating electrodes may be arranged to be parallel or perpendicular relative to one of a transmittance axis of an analyzer, a transmittance axis 15a of a polarizer 15 (shown in FIG. 3B) and an alignment treatment direction of an alignment-treated alignment layer.

Also in contrast to the conventional LCD device shown in FIG. 1, in the preferred embodiments of the present invention, the use of surrounding electrodes or side electrodes is not necessary. The structure of preferred embodiments of the present invention is sufficient to provide accurate desired alignment of LC molecules such that use of surrounding electrodes is unnecessary. This eliminates the difficulty, time and expense of forming the surrounding electrodes required in the manufacturing process of the conventional devices.

In addition, the upper vertical alignment layer 3 is preferably alignment-treated. Alternatively, the lower vertical alignment layer 3' may be alignment treated. More specifically, one of the upper and lower vertical alignment layers is alignment treated and the substrate having the other alignment layer, which is not alignment treated, is patterned to form slits or floating electrodes. The alignment treatment of the one of the upper and lower vertical alignment layers may be achieved by rubbing or photo-alignment or other alignment processes.

Further, an LC alignment controlling condition of the liquid crystal molecules which are located adjacent to one of the upper and lower substrates having the alignment-treated alignment layer is the alignment direction, and an LC alignment controlling condition of the liquid crystal molecules adjacent to the substrate having slit patterns or floating electrodes is the lateral electric field induced by the slit patterns or the floating electrodes. The above described LCD according to the preferred embodiments of the present invention is defined as a LFIMD (Lateral Field Induced Multi-Domain) mode, which effectively uses the fringe field effect.

The alignment layers 3, 3' preferably include a material such as polyamide or polyimide based materials, PVA (polyvinylalcohol), polyamic acid or $SiO_2$. When rubbing is used to perform the alignment treatment, it is possible to apply any material suitable for the rubbing treatment.

Moreover, it is possible to form the upper and lower alignment layers using a photosensitive material such as PVCN (polyvinylcinnamate), PSCN (polysiloxanecinnamate), and CelCN (cellulosecinnamate) based materials. If photo-treatment processes are to be used, any material suitable for the photo-aligning treatment may be used.

Irradiating light on the alignment layer determines the alignment or pretilt direction and the pretilt angle. The light used in the photo-alignment is preferably a light in a range of ultraviolet light, and also can be unpolarized light, linearly polarized light, and partially polarized light.

FIG. 2A is a view of showing the alignment direction and the pixel electrode according to a preferred embodiment of the present LFIMD vertical alignment LCD. In the pixel electrode 5, the slits 7 are patterned to define a chevron pattern. The chevron pattern is defined such that longitudinal axes of the slits 7 are different and substantially symmetrical to each other in the first domain 21 and the second domain 20.

In the LFIMD vertical alignment LCD, the alignment direction of the alignment-treated alignment layer is parallel with the axis of symmetry of the slits. One of the transmittance axis 15a of the polarizer 15 and the transmittance axis of the analyzer 16 is parallel with the alignment direction, and the other axis is perpendicular to the alignment direction. As seen in FIG. 2A, the transmittance axis of the analyzer 16 is parallel to the axis of symmetry of the slits 7 and is parallel to the alignment treatment direction of the alignment-treated alignment layer and the transmittance axis 15a of the polarizer 15 is perpendicular to the axis of symmetry of the slits 7.

The portion of the pixel electrode 5 which remains after forming the slits defines an equal-electric potential, and an equal-electric potential curve is parallel with the longitudinal axis of the slits 7. As a result, the electric field is formed to be perpendicular to the equal-electric potential curve, and the lateral electric field is induced to be parallel with the shorter axes of the slits.

Also, an equal-electric potential curve is formed in an vertical direction of the LCD, and a vertical electric field is formed according to the equal-electric potential curve. The vertical electric field is mirror-symmetrical and the middle line of the slits defines the axis of symmetry for the vertical electric field. If one vertical alignment layer is not alignment-treated and a voltage greater than the threshold voltage ($V_{th}$) is applied to the LCD, a disclination line is generated at the middle of the slits.

Figure 2B:
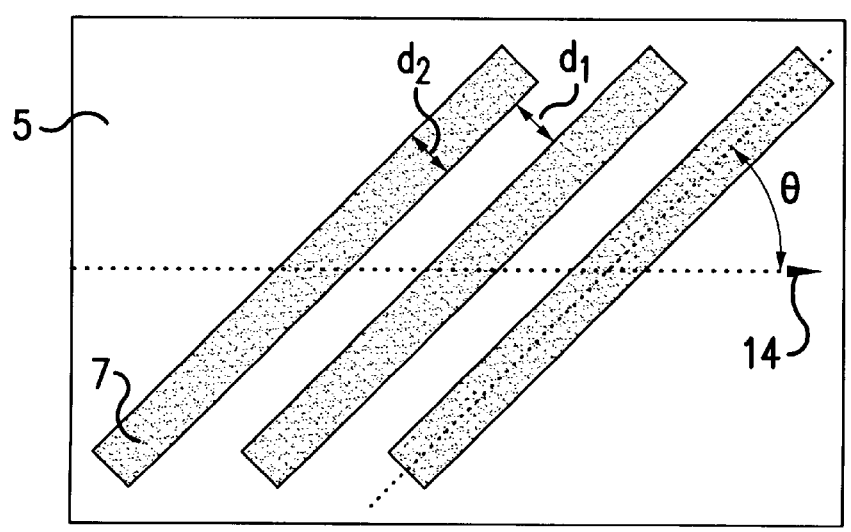
FIG. 2B is a view showing longitudinal axes of the slits and the alignment direction of the LCD in the FIG. 2A.

FIG. 2B is a view of showing longitudinal axes of the slits and the alignment direction of the LCD in FIG. 2A. The reference θ in FIG. 2B is an acute angle between the alignment direction 14 and the longitudinal axis of the slit 7. When the distance $d_1$ between the slits 7 in the pixel electrode 5 is narrower and the thickness of the liquid crystal cell is thinner and the width $d_2$ of the slit 7 is broader, the lateral electric field is stronger.

On the upper vertical alignment layer, when a voltage greater than $V_{th}$ is applied to the LCD, the azimuthal angle of the LC molecules is the alignment direction. The pretilt angle of the LC molecules is determined by a material used for the vertical alignment layer, the rubbing strength, and the rubbing depth by the rubbing cloths, when using rubbing alignment treatment. On the lower vertical alignment layer, the azimuthal angle of the LC molecules is the longitudinal axis of the slit which is perpendicular to the electric field. The pretilt angle of the LC molecules is 90 degrees in the middle of the slits, and (90 degrees-$\Delta\theta$) and (90 degrees+$\Delta\theta$) at the both sides of the slits ($\Delta\theta$ represents an angle less than 90 degrees).

If the width of the slits is about 1 μm to about 3 μm, the liquid crystal molecules are effected by the rounded alignment which is arranged a continuous bend in an elastic body. Then when the width of the slits is about 2 μm to about 6 μm, the pretilt angle is continuously changed without causing disclination. Therefore, on the upper alignment layer, the LC molecules are aligned according to the alignment direction. On the slit pattern of the lower alignment layer, the average pretilt angle of the LC molecules is preferably about 90 degrees, and the LC molecules are aligned in one direction between the both end directions of the longitudinal axis of the slit.

Between both end directions of the longitudinal axis of the slit, the twist angle of the LC molecules in one direction is less than about 90 degrees and the twist angle of the LC molecules in the other direction is greater than about 90 degrees. More specifically, the twist of the LC molecules in one direction is clockwise, and the twist of the LC molecules in the other direction is counterclockwise.

As a result, the LC molecules tend to twist in the direction that the twist angle of the LC molecules is less than about 90 degrees and the elastic energy of the LC molecules is small. On the upper alignment layer, the pretilt angle is smaller and the LC molecules are aligned uniformly in one domain without disclination and without regard to the width of the slit.

Therefore, in the LFIMD mode LCD, the transmittance is determined by the angle $\theta$ between the alignment direction and the longitudinal axis of the slit. In order to increase the transmittance and the viewing angle, $\theta$ is preferably almost 90 degrees. However, when $\theta$ is about 90 degrees, the longitudinal axes of the slits in the first and second domains are aligned in the same direction, and then $\theta$ may be set to about 60 degrees to about 70 degrees.

FIG. 3A is a view of showing the alignment direction and the pixel electrode of a preferred embodiment of the present LFIMD vertical alignment LCD. The alignment direction 14 is parallel with one axis between two longitudinal axes of the slits 7. In FIG. 3A, the upper alignment layer is alignment-treated in the direction of the longitudinal axis of the slits in the first domain 21.

Figure 3B:
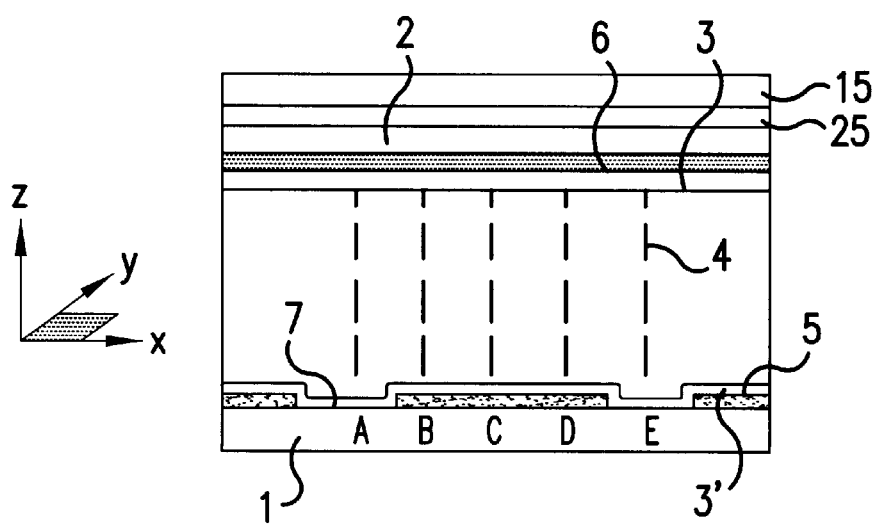
FIG. 3B is a sectional view showing liquid crystal molecule alignment of the LCD in the FIG. 3A at $V<V_{th}$.

FIG. 3B is a sectional view taken along the longitudinal axis of the slits 7 in the first domain in FIG. 3A at $V<V_{th}$. On the lower alignment layer, the LC molecules 4 are aligned vertically at about 90 degrees, the twist angle is preferably the same as the twist angle of the upper alignment layer to minimize the distortion.

More specifically, the upper alignment layer is preferably rubbing-treated, and the pretilt angle is almost about 85 degrees. In the alignment of LC molecules in portions A–E, the pretilt angle is slightly changed, and the twist angle is vertically aligned.

Table 1 representing pretilt angle, twist angle, and alignment structure on each portion is as follows.

TABLE 1

| | Alignment Structure at $V < V_{th}$ | | | | |
| | Upper Substrate | | Lower Substrate | | |
| Portion | Pretilt Angle | Twist Angle | Pretilt Angle | Twist Angle | Alignment Structure |
| --- | --- | --- | --- | --- | --- |
| A | 85° | 90° | 90° | 90° | Vertical Alignment |
| B | 85° | 90° | 90° | 90° | Vertical Alignment |
| C | 85° | 90° | 90° | 90° | Vertical Alignment |
| D | 85° | 90° | 90° | 90° | Vertical Alignment |
| E | 85° | 90° | 90° | 90° | Vertical Alignment |

When the pretilt angle on the upper alignment layer is below 90 about degrees, the light leakage is obtained from the following equation 1. The pretilt angle on the upper alignment layer is $\theta$, and the average pretilt angle $\theta'$ in the LC cell is about $(\theta+90)/2$.

$$I_{leakage} = 1/2(\sin^2 \delta/2) \quad \text{EQUATION 1}$$
$$\delta = ((\eta_e(\theta') - \eta_0)d)/\lambda$$
$$\theta' = (\theta + 90)/2$$
$$1/(\eta_e^2(\theta')) = (\cos^2\theta'/\eta_e^2) + (\sin^2\theta'/\eta_e^2)$$

Figure 8:
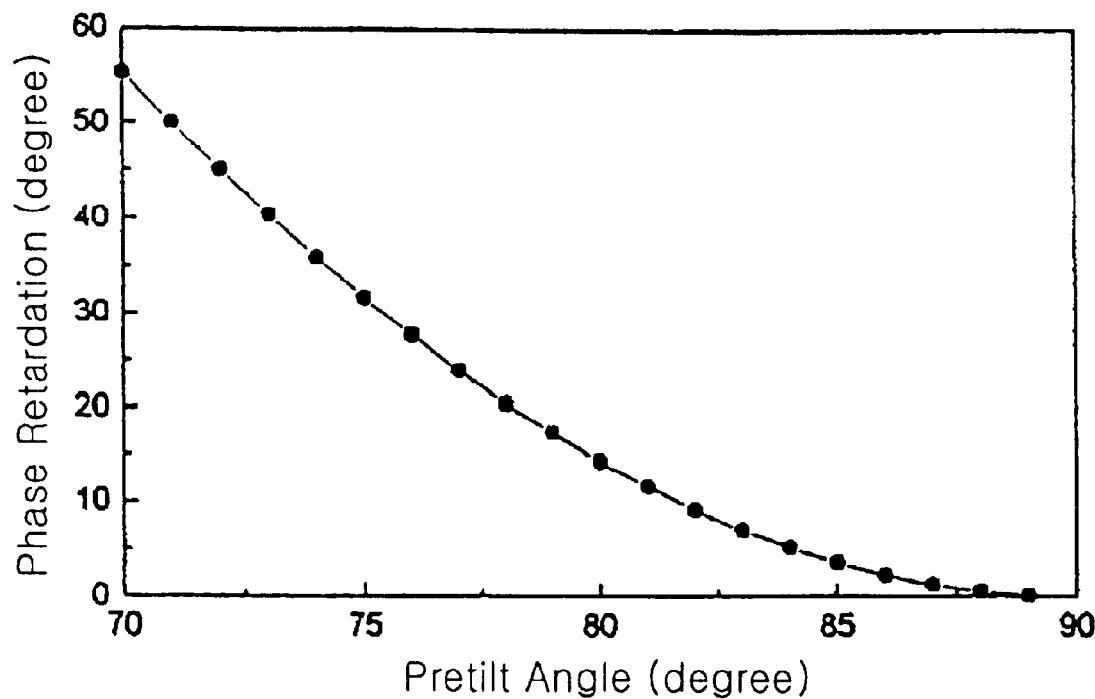
FIG. 8 is a graph showing the pretilt angle of the liquid crystal molecules on the alignment-treated vertical alignment layer versus the phase retardation of the LC cell of the present invention.

FIG. 8 is a graph of showing the pretilt angle of the liquid crystal molecules on the rubbing-treated vertical alignment layer versus the phase retardation of the LC cell, when the extraordinary refractive index ($n_e$) of the LC layer is about 1.6, the ordinary refractive index ($n_o$) is about 1.5, and the thickness of the LC layer is about 5 μm.

Figure 9:
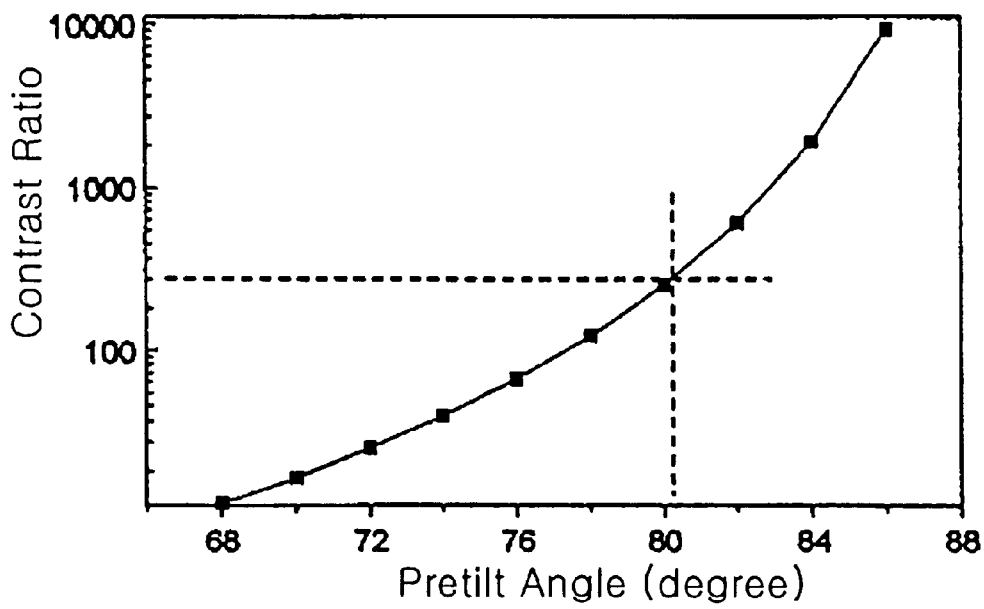
FIG. 9 is a graph showing the pretilt angle of the liquid crystal molecules on the alignment-treated vertical alignment layer versus the contrast ratio of the LC cell of the present invention.

FIG. 9 is a graph showing the pretilt angle of the liquid crystal molecules on the rubbing-treated vertical alignment layer versus the contrast ratio of the LC cell of preferred embodiments of the present invention. The contrast ratio generally required is greater than 300. Therefore, the upper alignment layer is rubbing-treated so that the pretilt angle thereof is about 80 degrees or more. If the pretilt angle of the upper alignment layer is not near 90 degrees, the phase retardation becomes larger and the light leakage is greater. Therefore, the pretilt angle is preferably greater than about 80 degrees.

Figure 3C:
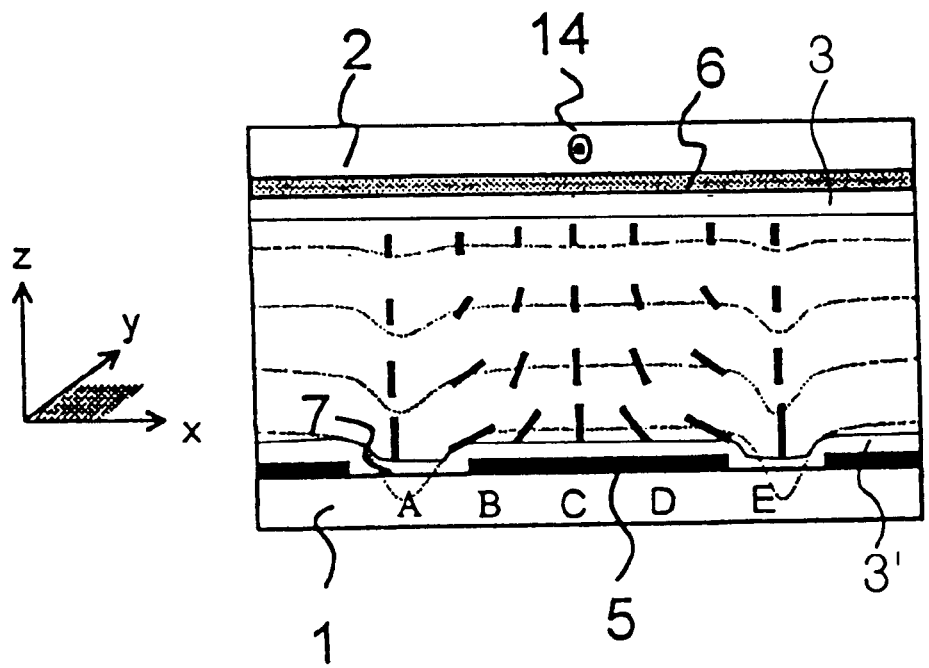
FIG. 3C is a sectional view showing liquid crystal molecule alignment of the LCD in the FIG. 3A at $V>V_{th}$.

FIG. 3C is a sectional view showing liquid crystal molecule alignment in the first domain 21 of the FIG. 3A at $V>V_{th}$. When a voltage over $V_{th}$ is applied to the LCD, the azimuthal angles of the LC molecules on the lower alignment layer are induced by the lateral electric field.

More particularly, at locations of the slits 7 and corners B, D of the pixel electrode 5, the LC molecules are aligned perpendicular to the lateral electric field. The azimuthal angle is determined by controlling the width $d_2$ of the slit 7.

At locations in the middle of the portions A, E of the slit 7 and the middle of the portion C of the pixel electrode 5, the pretilt angles of the LC molecules are symmetrical. But, since the pretilt angles of the LC molecules are asymmetrical on the upper alignment layer, the LC molecules are tilted and the twist angle is determined so as to minimize the distortion of the LC molecules.

On the upper alignment layer, the alignment direction 14 is the Y axis, in the portions A, C, E on the lower alignment layer, the pretilt angles of the LC molecules are symmetrical. As a result, it is difficult for the LC molecules to tilt in the X axis direction.

In the portions A, C, E, the LC molecules are tilted in the Y axis direction under the condition of symmetry of the lateral and vertical electric fields and the condition of minimum distortion of the LC molecules. When the LC molecules are tilted in the +Y axis direction, they are bend-aligned in the portions A, C, E, and when the LC molecules are tilted in the −Y axis direction, they are parallel-aligned. Since the distortion of the LC molecules is smaller in the parallel alignment than with the bend alignment, they are tilted in −Y axis direction.

Table 2 representing the pretilt angle, twist angle, and alignment structure at each portion is as follows.

TABLE 2

Alignment Structure in the first domain at $V > V_{th}$.

| | Upper Substrate | | Lower Substrate | | |
|---|---|---|---|---|---|
| Portion | Pretilt Angle | Twist Angle | Pretilt Angle | Twist Angle | Alignment Structure |
| A | 85° | 90° | 90° | 270° | Parallel Alignment |
| B | 85° | 90° | 85° | 0° | Left-Handed Twist Alignment |
| C | 85° | 90° | 90° | 270° | Parallel Alignment |
| D | 85° | 90° | 85° | 180° | Right-Handed Twist Alignment |
| E | 85° | 90° | 90° | 270° | Parallel Alignment |

Figure 10:
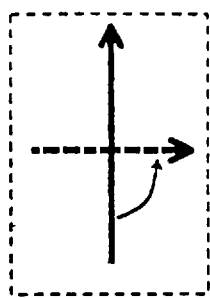
FIG. 10 is a view showing the LC alignment controlling condition in each portion on the alignment layer of the present LC cell.
Figure 10:
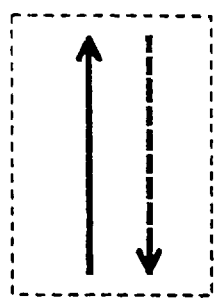
Figure 10:
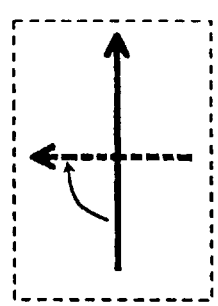

FIG. 10 is a view of showing the LC alignment controlling condition of the LC molecules in each portion on the alignment layer of the present LC cell. On the upper and lower alignment layers, the LC alignment structure is obtained from the boundary condition by using a continuum theory.

The LC molecules are distorted continuously on the portions A, B, C, D, E. So, when the transmittance axis 15a of the polarizer 15 is arranged at about 45 degrees and the transmittance axis of the analyzer is perpendicular to the transmittance axis 15a of the polarizer 15, the light is transmitted by the change of the phase retardation resulting from the optical anisotropy of the parallel-aligned LC molecules in the portions A, C, E. The light is transmitted by the optical activity resulting from the left-handed twisted LC molecules in the portion B, and the light is transmitted by the optical activity resulting from the right-handed twisted LC molecules in the portion D.

Further, in the portions between each portion A, B, C, D, E respectively, the light is transmitted by the optical anisotropy of the parallel-aligned LC molecules and the optical activity of the twisted LC molecules. Therefore, light transmittance in the entire LCD is very high.

Thus, as is seen in FIG. 3C, a plurality of the liquid crystal molecules are twisted in a spiral or corkscrew configuration so as to define a spiral twist pattern, as seen in portions B and D, for example. The spiral twist patterns at portions B and D are spaced from each other in a direction extending along a longitudinal axis of the upper and lower alignment substrates. Others of the LC molecules are not twisted relative to the alignment layers and define portions, like A, C and E, which do not have twist and do not define any spiral twist pattern. The spiral twist patterns in portions B and D are separated by LC molecules which define portions A, C, E having no twist.

It should be noted that in addition to the twist of some of the LC molecules in FIG. 3C, many or all of the LC molecules may be tilted in a direction that is substantially parallel to an alignment-treatment direction of an alignment-treated alignment layer. This direction of tilt is shown as extending into the plane of the drawing sheet of FIG. 3C at point 14.

It also should be noted that the degree of twist of the LC molecules is greater for LC molecules located closer to the lower substrate and lower alignment layer and is less for LC molecules located closer to the upper substrate and the upper alignment layer.

In order to maximize the increase in light transmittance, while the transmittance axis 15a of the polarizer 15 is changed at the transmittance axis 15a of the polarizer 15 to about 45 degrees relative to the alignment direction, the transmittance axis of the polarizer at which transmittance is maximum is determined.

The light transmittance of the parallel-aligned LC molecules is maximum at the point where the longitudinal axis of the LC molecule is about 45 degrees relative to the light axis of the polarizer. But, since the light transmittance generated by the optical activity is maximum at the point of the longitudinal axis of the LC molecule which is the same as the transmittance of the polarizer 15, adjustment is made such that the alignment direction is about 0 degrees to about 50 degrees relative to the transmittance axis 15a of the polarizer 15 so that the sum of the two components is maximum. In order to maximize the transmittance generated by the optical activity, the averages of the pretilt angles of the LC molecules on the upper and lower alignment layers should be almost the same.

The pretilt angle on the upper alignment layer is determined by the alignment density, and the pretilt angle on the lower alignment layer is determined by the width of the slit pattern. Thus, the width of the slit pattern on the lower alignment layer should be about 5 $\mu$m to about 15 $\mu$m, and the pretilt angle on the upper alignment layer should be 84 degrees to about 88 degrees.

When the alignment direction is different than the longitudinal axis of the slit for θ, the twist angle of the one is 90−θ and the twist angle of the other is 90+θ. If θ is equal to or less than about 30 degrees, the vertical alignment liquid crystal display device has some kinetic stability. However, in this case, the pretilt angle should be equal to or less than about 85 degrees, then the contrast ratio is decreased, and the response time is long, which results from the large twist angle.

Figure 3D:
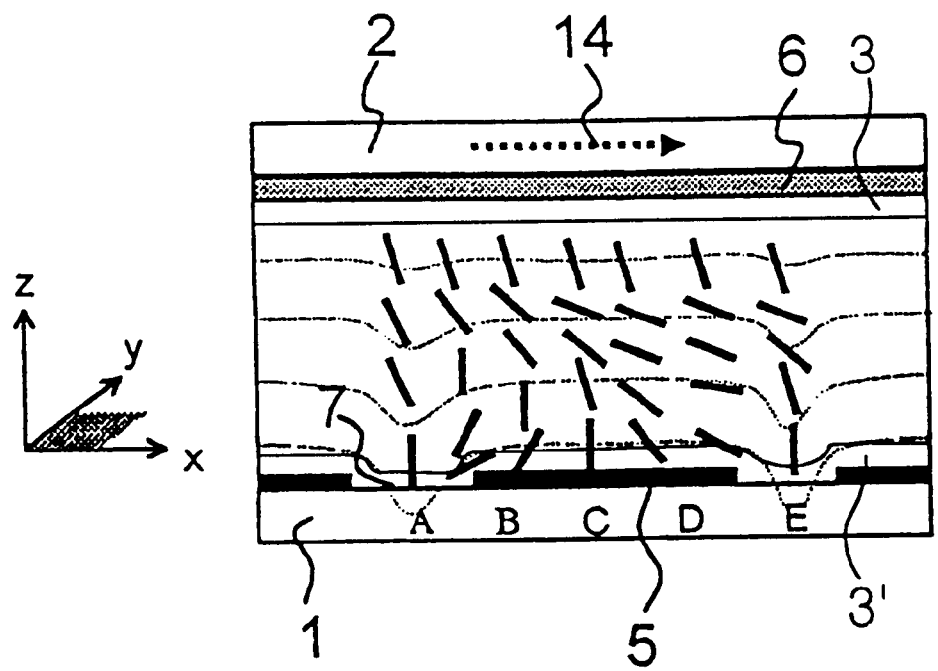
FIG. 3D is a sectional view showing liquid crystal molecule alignment of the LCD in the FIG. 3A at $V>V_{th}$.

FIG. 3D is a sectional view taken along the longitudinal axis of the slits 7 in the second domain in the FIG. 3A at $V>V_{th}$. Because the longitudinal axis of the slits in the second domain is different than that in the first domain, the alignment direction of the upper alignment layer is the X axis direction.

Table 3 representing the pretilt angle, twist angle, and alignment structure on each portion in the FIG. 3D is as follows. When the voltage is low in B, the bend alignment structure is present, and when the voltage is high in B, the 180 degree twisted alignment structure is present. If the alignment structure is changed discontinuously according to the applied voltage, the boundary condition on the alignment layer is adjusted to remove the display inferiority caused by the hysteresis of the electro-optical transmittance curve.

TABLE 3

| | Alignment Structure in the second domain at V > $V_{th}$ | | | | |
|---|---|---|---|---|---|
| | Upper Substrate | | Lower Substrate | | |
| Portion | Pretilt Angle | Twist Angle | Pretilt Angle | Twist Angle | Alignment Structure |
| A | 85° | 0° | 90° | 180° | Parallel Alignment |
| B | 85° | 0° | 85° | 0° | Bend or 180° Twist Alignment |
| C | 85° | 0° | 90° | 180° | Parallel Alignment |
| D | 85° | 0° | 85° | 180° | Parallel Alignment |
| E | 85° | 0° | 90° | 180° | Parallel Alignment |

FIG. 4 is a view of showing the alignment direction and the pixel electrode according to another preferred embodiment of the present LFIMD vertical alignment LCD.

In the pixel electrode 5, the slits 7 are patterned so as to define a chevron configuration. The longitudinal axes of the slits are different and symmetrical to each other in the first domain 21 and the second domain 20.

In the LFIMD vertical alignment LCD, the alignment direction of the alignment-treated alignment layer is preferably perpendicular to the symmetry axis of the slits. One of the transmittance axis 15a of polarizer 15 and the transmittance axis of analyzer 16 is parallel to the alignment direction, and the other axis is perpendicular to the alignment direction.

The pixel electrode which remains and is not removed by the slit formation process defines an equal-electric potential, and a resulting equal-electric potential curve is parallel with the longitudinal axis of the slit, as described above. As a result, the electric field is perpendicular to the equal-electric potential curve, and the lateral electric field is induced to be parallel with the short axis of the slit.

In this preferred embodiment, the acute angle θ between the alignment direction 14 and the longitudinal axis of the slit 7 is preferably about 45 degrees. Moreover, preferably, the pixel electrode width $d_1$ is about 5 μm to about 6 μm, and the slit pattern width $d_2$ is about 8 μm to about 10 μm.

FIG. 5 is a view of showing the alignment direction and the pixel electrode according to another preferred embodiment of the present LFIMD vertical alignment LCD.

In the pixel electrode 5, the slits 7 are patterned to be parallel with the transmittance axis 15a of the polarizer 15. In the LFIMD vertical alignment LCD, the alignment direction 14 of the alignment-treated alignment layer is parallel with the longitudinal axis of the slits 7.

The pixel electrode which remains and is not removed during slit patterning creates an equal-electric potential, and a resulting equal-electric potential curve is parallel with the longitudinal axis of the slit. As a result, an electric field is formed to be perpendicular with the equal-electric potential curve, and the lateral electric field is induced to be parallel with the short axis of the slit.

In this preferred embodiment, for example, the pixel electrode width $d_1$ is preferably about 5 μm to about 7 μm, and the slit pattern width $d_2$ is preferably about 13 μm to about 16 μm.

Figure 6:
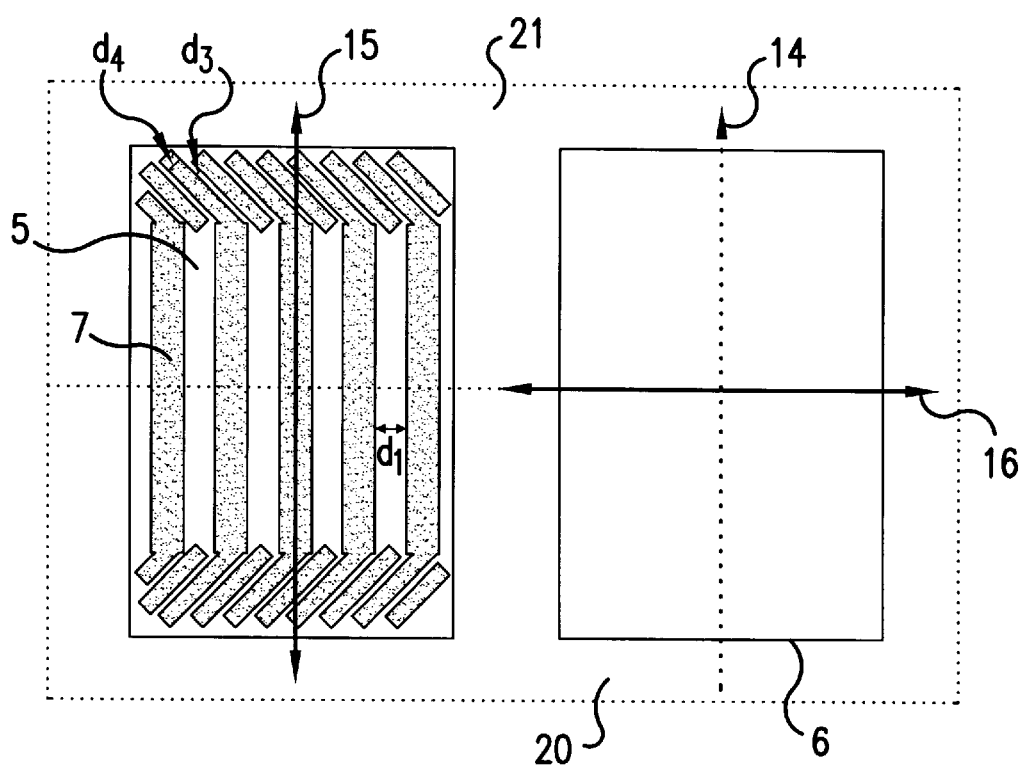
FIG. 6 is a view showing the alignment direction and the pixel electrode according to another preferred embodiment of the present LFIMD vertical alignment LCD.

FIG. 6 is a view of showing the alignment direction and the pixel electrode according to another preferred embodiment of the present LFIMD vertical alignment LCD.

In the pixel electrode 5, the slits 7 are patterned so that the longitudinal axes of the slits are parallel with the transmittance axis 15a of the polarizer 15 in the middle of the pixel electrode 5 and the longitudinal axes of the slits are arranged at an angle of about 45 degrees relative to the transmittance axis 15a of the polarizer 15 at the both sides of the pixel electrode 5.

In the LFIMD vertical alignment LCD, the alignment direction of the alignment-treated alignment layer is parallel with the transmittance axis of the polarizer 15.

The pixel electrode which remains, and is not removed during slit patterning creates an equal-electric potential, and a resulting equal-electric potential curve is parallel with the longitudinal axis of the slit. As a result, the electric field is formed to be perpendicular with the equal-electric potential curve, and the lateral electric field is induced to be parallel with the short axis of the slit.

In this preferred embodiment, preferably, the pixel electrode width $d_1$ is about 5 μm to about 6 μm, and the slit pattern width $d_2$ is about 15 μm. In addition, the other pixel electrode width $d_3$ is preferably about 5 μm to about 6 μm, and the other slit pattern width $d_4$ is preferably about 8 μm to about 10 μm.

Figure 7A:
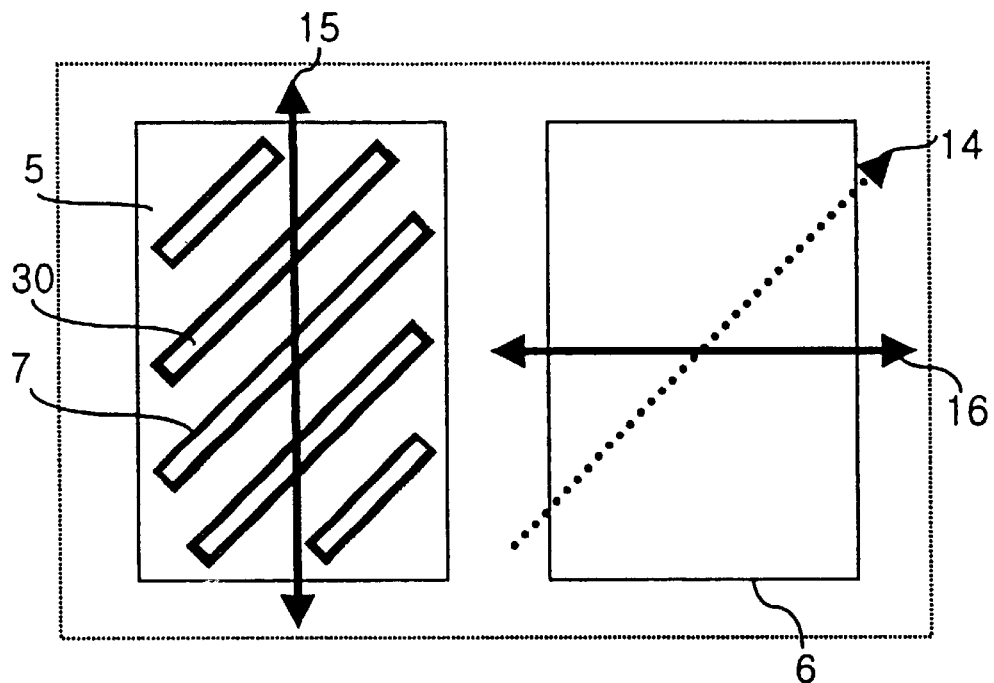
FIGS. 7A, 7C, and 7D are a view showing the alignment direction and the pixel electrode of the present LFIMD vertical alignment LCD having floating electrodes.

FIG. 7A is a view of another preferred embodiment of the present invention showing the alignment direction and the pixel electrode of the present LFIMD vertical alignment LCD having floating electrodes instead of the slits shown in the preferred embodiments described above. A floating electrode has the structure as seen in FIG. 7A and is isolated from the pixel electrode.

The voltage of the floating electrode 30 is changed according to the capacitance ratio between the floating electrode and the pixel and common electrodes 5, 6. The voltage $V_{FL}$ that is induced to the floating electrode is obtained from the following equation 2.

$$V_{FL} = [C_{LC}/(C_{LC} + C_{FL})] \times V \qquad \text{EQUATION 2}$$

$C_{LC}$: Capacitance generated by the vertical electric field between the floating electrode and the common electrode.

$C_{FL}$: Capacitance generated by the lateral electric field between the floating electrode and the pixel electrode.

V: Voltage which is induced to the floating electrode.

The voltage which is induced to the common electrode is 0 V.

The voltage which is induced to the floating electrode could be controlled by the distance between the floating electrode and the pixel electrode, and the width of the floating electrode.

When $C_{LC} \gg C_{FL}$, the voltage difference between the floating electrode and the common electrode is decreased, and the driving voltage is increased.

The ratio of $C_{LC}$ and $C_{FL}$ is determined by the driving voltage, therefore, when the voltage of the pixel electrode is below $V_{th}$, the ratio has a value of from about 2:3 to about 1:4. In this case, if the LC is driven at 5V, the dielectric constant of the LC layer is doubled for 10V being applied to the pixel electrode, thus, the ratio is from about 1:0.7 to about 1:2 and the voltage of LC layer on the floating electrode is about 3V to about 6V.

Figure 7B:
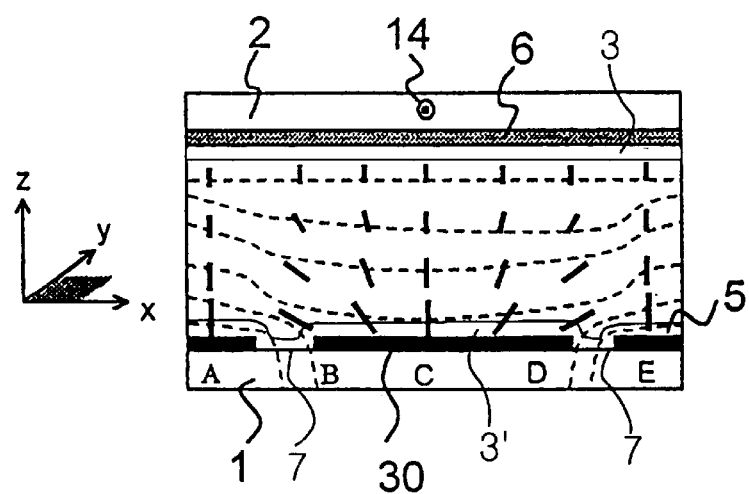
FIG. 7B is a sectional view showing liquid crystal molecule alignment of the LCD in FIG. 7A at $V>V_{th}$.

FIG. 7B is a sectional view of taken along the short axis of the floating electrode in the FIG. 7A at V>V$_{th}$. A value between the voltage of the pixel electrode 5 and the voltage of the common electrode 6 is applied to the floating electrode 30.

Figure 7C:
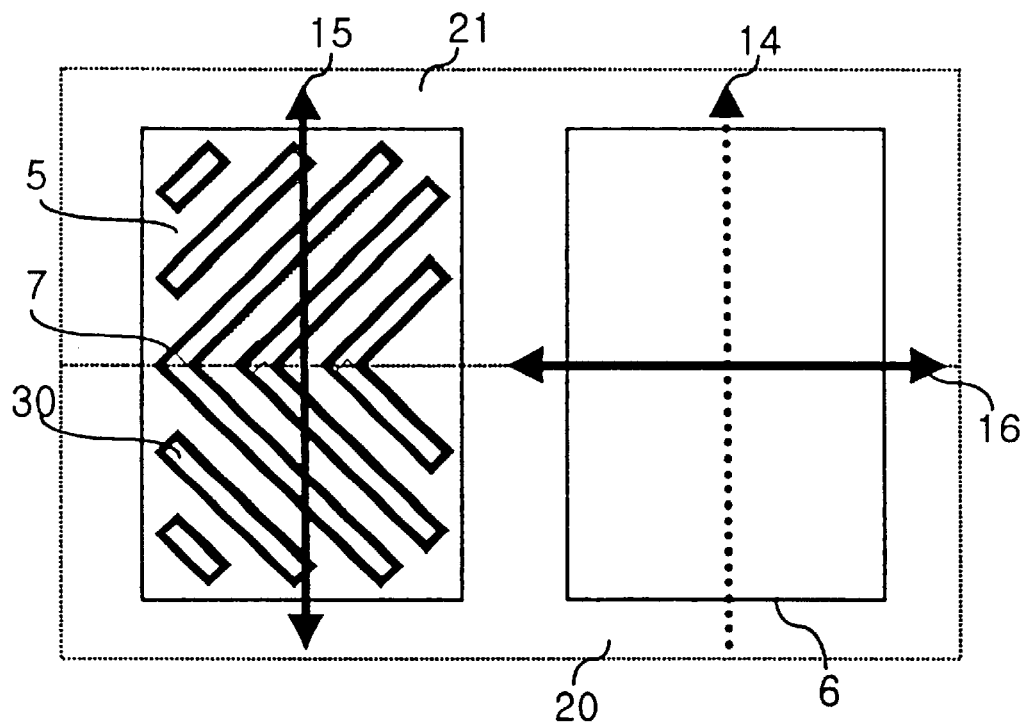

FIG. 7C is a view of another preferred embodiment of the present invention showing the alignment direction and the pixel electrode of the present LFIMD vertical alignment LCD having floating electrodes instead of the slits shown in the preferred embodiments described above. A floating electrode has the structure as seen in FIG. 7C and is isolated from the pixel electrode.

In the pixel electrode 5, the slits 7 are patterned so as to define a chevron configuration. The longitudinal axes of the slits are different and symmetrical to each other in the first domain 21 and the second domain 20.

Figure 7D:
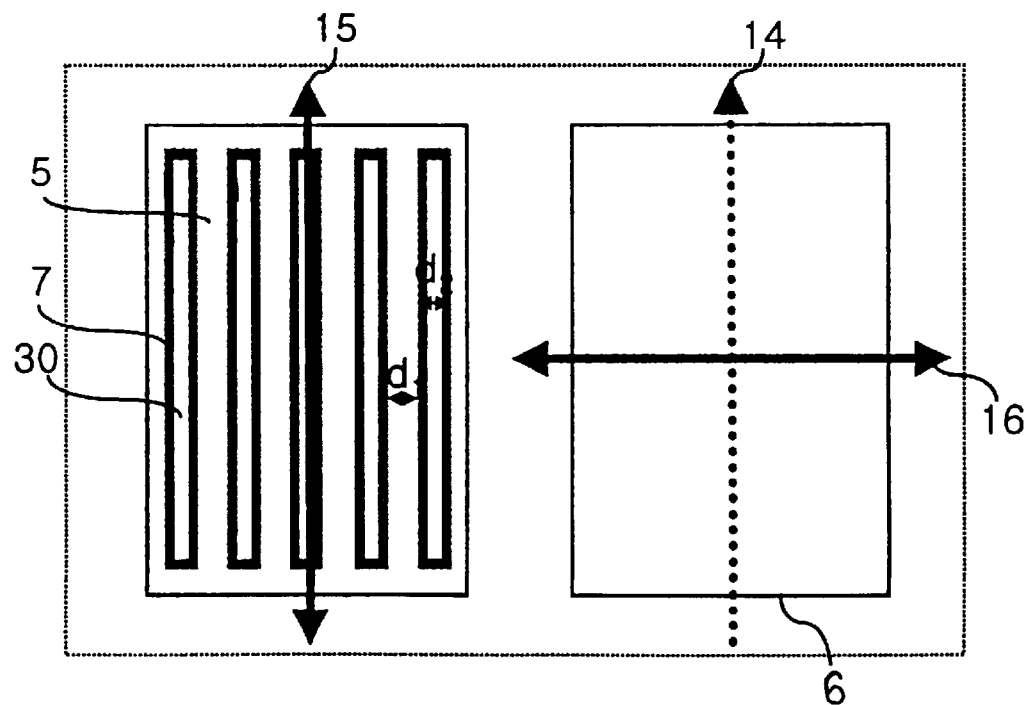

FIG. 7D is a view of another preferred embodiment of the present invention showing the alignment direction and the pixel electrode of the present LFIMD vertical alignment LCD having floating electrodes instead of the slits shown in the preferred embodiments described above. A floating electrode has the structure as seen in FIG. 7D and is isolated from the pixel electrode.

In the pixel electrode 5, the slits 7 are patterned to be parallel with the transmittance axis 15a of the polarizer 15. In the LFIMD vertical alignment LCD, the alignment direction 14 of the alignment-treated alignment layer is parallel with the longitudinal axis of the slits 7.

Table 4, representing the pretilt angle, twist angle, and alignment structure in each portion in the FIG. 7B is as follows. At V<V$_{th}$, the alignment structures are the same with the table 1.

TABLE 4

Alignment Structure with the floating electrode at V > V$_{th}$

| Portion | Upper Substrate | | Lower Substrate | | Alignment Structure |
|---------|-----------------|---|-----------------|---|---------------------|
|         | Pretilt Angle | Twist Angle | Pretilt Angle | Twist Angle | |
| A | 85° | 90° | 90° | 270° | Parallel Alignment |
| B | 85° | 90° | 85° | 0° | Left-Handed Twist Alignment |
| C | 85° | 90° | 90° | 270° | Parallel Alignment |
| D | 85° | 90° | 85° | 180° | Right-Handed Twist Alignment |
| E | 85° | 90° | 90° | 270° | Parallel Alignment |

To maximize the transmittance generated by the optical activity, the averages of the pretilt angles of the LC molecules on both alignment layers are preferably similar to each other. The pretilt angle on the upper alignment layer is determined by the alignment density, and the pretilt angle on the lower alignment layer is determined by the width of the short axis of the floating electrode. Thus, the width of the floating electrode on the lower alignment layer is preferably about 5 μm to about 15 μm, and the pretilt angle on the upper alignment layer is preferably about 84 degrees to about 88 degrees.

When the driving voltage is applied to the LCD, the optical anisotropy (Δn) and the cell gap (d) of the LC layer are adjusted to maximize the transmittance in the parallel-aligned LC layer. Although the display is perfectly white, the LC molecules are not entirely tilted, and then the Δn of the LC at the wavelength of 550 nm multiplied by d is greater than the half-wavelength of 0.275 μm. To increase the transmittance to greater than 90%, the phase is preferably about 140 degrees to about to about 220 degrees. More specifically, Δnd of the LC cell is preferably about 0.25 μm to about 0.45 μm.

To realize the wide-viewing angle in the vertical alignment LCD, at least one compensation film 25 (shown in FIG. 3B) is used. Regarding the LC molecules, the refractive index in the X axis direction is increased according to the tilt of the progress light, but regarding the compensation film including discotic liquid crystals, the refractive index is decreased.

The refractive index of LC is $n_z > n_x = n_y$, and the condition of the compensation film is $n_z < n_x = n_y$. To obtain the viewing angle in the up-down and left-right directions of about 120 degrees or greater under the contrast ratio of 10, $(((\eta_x + \eta_y)/2) - \eta_z) \times$ the thickness of the compensation film is about 0.8 to about 1.2 times Δnd. $(((\eta_x + \eta_y)/2) - \eta_z)$ represents the difference between the average refractive indexes of the lights vibrating in the horizontal direction and the vertical direction of the compensation film). The viewing angle is widest when Δnd of the LC cell is the same as the Δnd of the compensation film.

Consequently, in preferred embodiments of the present invention, since an alignment layer disposed on one of the upper and lower substrates is alignment-treated and the pixel electrode includes slit patterns or floating electrodes on the other substrate, the parallel and twist alignments are formed alternatively and continuously by the LC alignment controlling condition changed by the lateral electric field. As a result, it is possible to realize the multi-domain LCD of preferred embodiments of the present invention which provides greatly increased transmittance, much wider view angle and much more rapid response time.

In addition, all of the above advantages can be achieved with a much more simple construction and process as compared to conventional vertical alignment LCDs since no surrounding or side electrodes are necessary and no additional mask steps are required for forming slit patterns. Thus, increased yield and productivity of the multi-domain LCD of preferred embodiments of the present invention.

It will be apparent to those skilled in the art that various modifications can be made in the liquid crystal display device of the present invention without departing from the sprit or scope of the invention. Thus, it is intended that the present invention covers the modifications and variations of this invention within the scope of the disclosure herein and the appended claims and their equivalents.

This application claims the benefit of Korean Patent Application No. 1998-29992 filed on Jul. 25, 1998, which is hereby incorporated by reference.

What is claimed is:

1. A liquid crystal display device, comprising:
   an upper substrate including an upper alignment layer;
   a lower substrate including a lower alignment layer;
   a pixel electrode on the lower substrate, the pixel electrode being patterned to define at least one floating electrode; and
   a liquid crystal layer between the upper and lower substrates, the liquid crystal layer including crystal molecules having negative dielectric anisotropy, wherein a lateral electric field is generated between the at least one floating electrode and the pixel electrode when a voltage is applied to the liquid crystal layer.

2. The liquid crystal display device according to claim 1, wherein at least one of the upper alignment layer and the lower alignment layer is alignment-treated in an alignment-treatment direction.

3. The liquid crystal display device according to claim 2, wherein an angle between a longitudinal axis of the at least one floating electrode and the alignment-treatment direction is equal to or less than about 50 degrees.

4. The liquid crystal display device according to claim 2, wherein the at least one floating electrode is substantially parallel to an alignment treatment direction of the crystal layer.

5. The liquid crystal display device according to claim 1, wherein at least one of the upper alignment layer and the lower alignment layer is photo-alignment treated.

6. The liquid crystal display device according to claim 1, wherein at least one of the upper alignment layer and the lower alignment layer is rubbing-alignment treated.

7. The liquid crystal display device according to claim 1, further comprising a polarizer on the upper substrate, wherein an angle between a longitudinal axis of the at least one floating electrode and a transmittance axis of the polarizer is between about 0 degrees and about 50 degrees.

8. The liquid crystal display device according to claim 1, further comprising a common electrode on the upper substrate, a vertical electric field being generated between the pixel electrode and the common electrode when a voltage is applied to the liquid crystal layer.

9. The liquid crystal display device according to claim 1, wherein at least a portion of the liquid crystal molecules are twisted relative to the upper alignment layer and the lower alignment layer to define at least one spiral twist pattern extending between the lower substrate and the upper substrate when a voltage is applied to the liquid crystal display device.

10. The liquid crystal display device according to claim 9, wherein the at least one spiral twist pattern of the portion of the liquid crystal molecules has one of a left-handed twist configuration and a right-handed twist configuration.

11. The liquid crystal display device according to claim 1, wherein $\Delta n \times d_{LC}$ is about 0.25 μm to about 0.45 μm, and $\Delta n$ is the optical anisotropy of the liquid crystal molecules in a light wavelength of about 550 nm and $d_{LC}$ is a thickness of the liquid crystal layer.

12. The liquid crystal display device according to claim 1, wherein a pretilt angle of the upper alignment layer is about 84 degrees to about 89 degrees.

13. The liquid crystal display device according to claim 1, wherein a width of the at least one floating electrode is about 5 μm to about 15 μm.

14. A liquid crystal display device comprising:
an upper substrate including an upper alignment layer;
a lower substrate including a lower alignment layer;
a pixel electrode on the lower substrate, the pixel electrode being patterned to define at least one floating electrode;
a common electrode on the upper substrate; and
a liquid crystal layer between the upper and lower alignment layers, the liquid crystal layer including liquid crystal molecules having negative dielectric anisotropy, wherein a ratio of CFL to CLC is within about 1:1 to about 3:1, wherein CLC is a capacitance generated by a vertical electric field between the floating electrode and the common electrode and CFL is capacitance generated by a lateral electric field between the at least one floating electrode and the pixel electrode.

15. A liquid crystal display device comprising:
an upper substrate including an upper alignment layer;
a lower substrate including a lower alignment layer;
a pixel electrode on the lower substrate, the pixel electrode being patterned to define at least one floating electrode;
a liquid crystal layer between the upper and lower alignment layers, the liquid crystal layer including liquid crystal molecules having negative dielectric anisotropy; and
a compensation film, on at least one of the upper and lower substrates, wherein $(((n_x+n_y)/2)-n_z)*dc$ is about 0.8 to 1.2 times of $\Delta n d_{LC}$, wherein $(((n_x+n_y)/2)-n_z)$ is the difference between the average refractive indexes of lights vibrating in a horizontal direction and a vertical direction of the compensation film, dc is a thickness of the compensation film, $\Delta n$ is the optical anisotropy of the liquid crystal molecule, and $d_{LC}$ is the thickness of the liquid crystal layer.

16. A liquid crystal display device, comprising:
an upper substrate including an upper alignment layer;
a lower substrate including a lower alignment layer;
a pixel electrode on the lower substrate, said pixel electrode being patterned to define at least one slit; and
a liquid crystal layer between the upper and lower alignment layers, said liquid crystal layer including liquid crystal molecules having negative dielectric anisotropy, wherein the at least a portion of the molecules are arranged to be twisted in at least one spiral twist pattern extending between the lower substrate and the upper substrate.

17. A liquid crystal display device, comprising:
an upper substrate including an upper alignment layer;
a lower substrate including a lower alignment layer;
a pixel electrode on said lower substrate, said pixel electrode being patterned to define at least one floating electrode; and
a liquid crystal layer between said upper and lower alignment layers, said liquid crystal layer including liquid crystal molecules having negative dielectric anisotropy;
wherein at least a portion of the liquid crystal molecules are arranged to be twisted in at least one spiral twist pattern extending between the lower substrate and the upper substrate.

18. A liquid crystal display device, comprising:
an upper substrate including an upper alignment layer;
a lower substrate including a lower alignment layer;
a pixel electrode on the lower substrate, the pixel electrode being patterned to define at least one slit; and
a liquid crystal layer between the upper and lower alignment layers, the liquid crystal layer including liquid crystal molecules having negative dielectric anisotropy, wherein the at least one of the upper alignment layer and the lower alignment layer is alignment-treated in an alignment-treatment direction, and an angle between a longitudinal axis of at least one slit and the alignment-treatment direction is equal to or less than about 50 degrees.

19. The liquid crystal display device according to claim 18, wherein at least one of the upper alignment layer and the lower alignment layer is photo-alignment treated.

20. The liquid crystal display device according to claim 18, wherein at least one of the upper alignment layer and the lower alignment layer is rubbing-alignment treated.

21. The liquid crystal display device according to claim 18, further comprising a polarizer on the upper substrate, wherein an angle between a longitudinal axis of the at least one slit and a transmittance axis of the polarizer is between about 0 degrees and about 50 degrees.

22. The liquid crystal display device according to claim 18, further comprising a common electrode on the upper substrate, wherein a vertical electric field is generated between the pixel electrode and the common electrode and a lateral electric field is generated between the at least one slit and the pixel electrode when a voltage is applied to the liquid crystal display device.

23. The liquid crystal display device according to claim 22, wherein the ratio of CFL to CLC is within about 1:1 to about 3:1, wherein CLC is a capacitance generated by the vertical electric field between the pixel electrode and the common electrode and CFL is a capacitance generated by the lateral electric field between the at least one slit and the pixel electrode.

24. The liquid crystal display device according to claim 18, wherein at least a portion of the liquid crystal molecules are twisted relative to the upper alignment layer and the lower alignment layer to define at least one spiral twist pattern extending between the lower substrate and the upper substrate when a voltage is applied to the liquid crystal display device.

25. The liquid crystal display device according to claim 24, wherein the at least one spiral twist pattern of the portion of the liquid crystal molecules has one of a left-handed twist configuration and a right-handed twist configuration.

26. The liquid crystal display device according to claim 18, further comprising a plurality of floating electrodes in the pixel electrode.

27. The liquid crystal display device according to claim 18, where in $\Delta n \times d_{LC}$ is about 0.25 $\mu$m to about 0.45 $\mu$m, and $\Delta n$ is the optical anisotropy of the liquid crystal molecules in a light wavelength of about 550 nm and $d_{LC}$ is a thickness of the liquid crystal layer.

28. The liquid crystal display device according to claim 18, further comprising a compensation film on at least one of the upper and lower substrates, wherein $(((n_x+n_y)/2)-n_z)*dc$ is about 0.8 to 1.2 times of $\Delta nd_{LC}$, wherein $(((n_x+n_y)/2)-n_z)$ is the difference between the average refractive indexes of lights vibrating in a horizontal direction and a vertical direction of the compensation film, dc is a thickness of the compensation film, $\Delta n$ is the optical anisotropy of the liquid crystal molecule, and dLC is the thickness of the liquid crystal layer.

29. The liquid crystal display device according to claim 18, wherein a pretilt angle of the upper alignment layer is about 84 degrees to about 89 degrees.

30. The liquid crystal display device according to claim 18, wherein a width of the at least one slit is about 5 $\mu$m to about 15 $\mu$m.

31. The liquid crystal display device according to claim 18, wherein the at least one slit is substantially parallel to an alignment-treatment direction.

* * * * *